April 6, 1965 R. B. SPOKAS 3,176,722
HYDRAULIC VALVE DEVICE
Filed Aug. 6, 1962
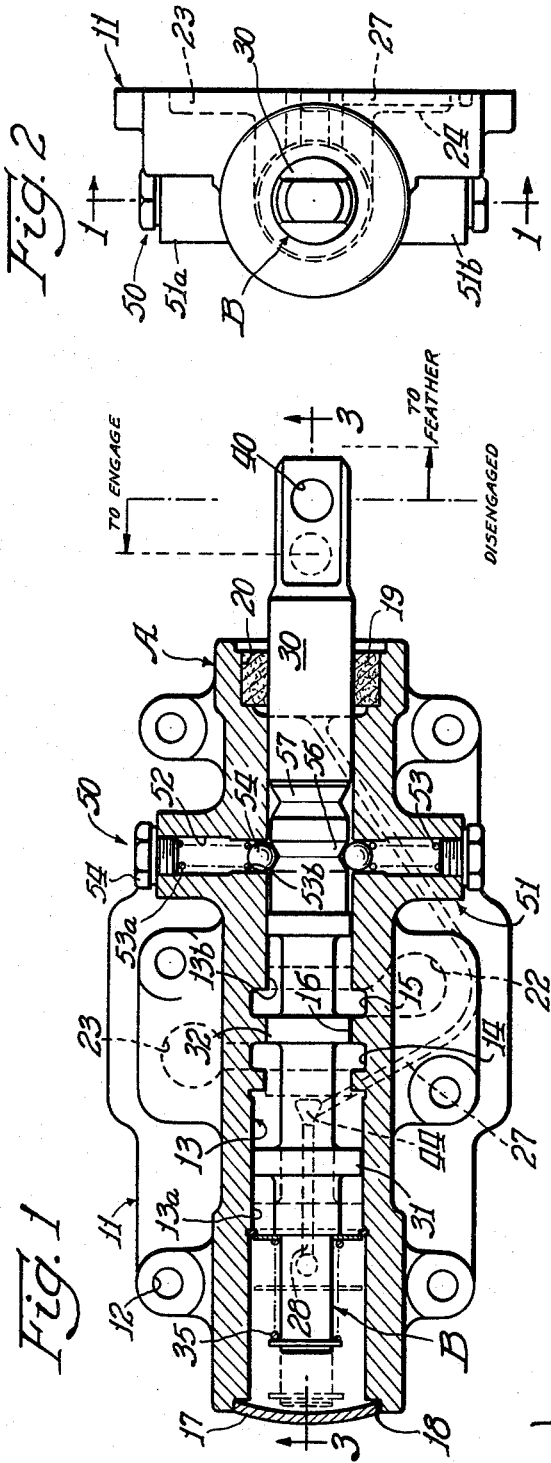
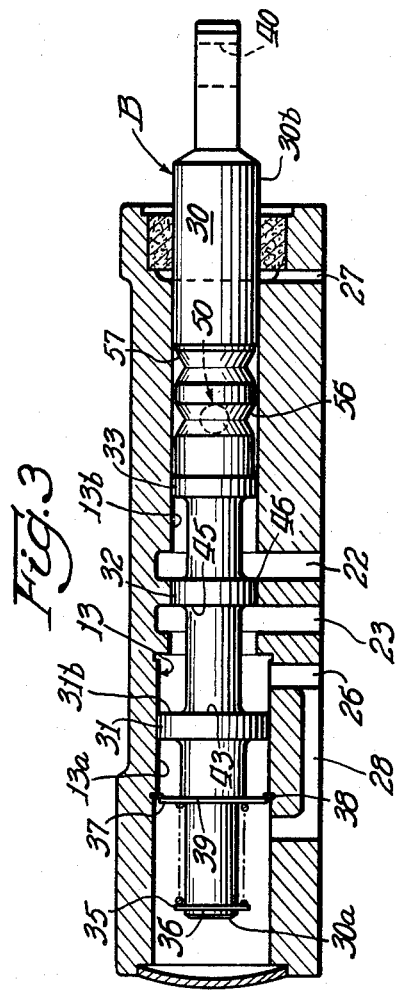
Inventor:
Romas B. Spokas
By: Joseph W. Malleck Atty.

3,176,722
HYDRAULIC VALVE DEVICE
Romas B. Spokas, Rockford, Ill., assignor to Borg-Warner Corporation, a corporation of Illinois
Filed Aug. 6, 1962, Ser. No. 215,193
5 Claims. (Cl. 137—625.69)

This invention relates to hydraulic control valves and more particularly to a manually operated hydraulic valve adapted to provide for ease of infinite variation of the controlled fluid between the fully closed and fully opened positions of the valve.

Those experienced in the hydraulic clutch art have long felt the need for means which would enable hydraulic clutches to simulate the actuation of mechanical clutches in the ability to infinitely vary the amount of slip that takes place between the friction engaging surfaces. The control valve, as contemplated by this invention, provides for the necessary variation in fluid supplied to a hydraulic clutch.

The control valve of this invention is of the manually operated type and features means which are adapted to impart a proportional "feel" to the operator in accordance with the amount of controlled fluid being supplied to the clutch. The operator, therefore, immediately has a valve response which guides him in manipulating the clutch device for providing an infinitely variable slip according to the desired condition.

Therefore, a primary object of this invention is to provide an improved hydraulic control valve and more particularly one which is of the manual operated type.

Another object of this invention is to provide a hydraulic control valve which is adapted to be moved in one direction from a neutral position for providing a fully opened condition of the valve and adapted to be moved in an opposite direction from neutral position accompanied by a proportional tendency to return to the neutral position thereby affording a "feel" to the operator when moved in the latter direction.

Still another object of this invention is to provide a hydraulic control valve of the spool type having differential land areas thereon and arranged so that in one regulating condition of the valve, a drain port in communication with the space between the differential lands is adapted to be gradually closed off in accordance with the amount of axial movement of the valve spool and thereby vary the pressure between the differential lands and impart a return force opposite in direction to that in which the valve is being moved manually.

Other objects and features of the invention will be readily apparent to those skilled in the art from the specification and appended drawings illustrating a certain preferred embodiment in which:

FIGURE 1 is a central sectional view of a hydraulic control valve embodying the principles of this invention and taken along line 1—1 of FIGURE 2;

FIGURE 2 is an end elevational view of the control valve of FIGURE 1; and

FIGURE 3 is another sectional view of the valve device taken substantially along line 3—3 of FIGURE 1.

Referring now to the drawings and more particularly to FIGURE 1, there is illustrated a preferred embodiment of the present invention. In the broad aspects, the hydraulic control valve comprises a valve housing A adapted to receive a slidable valve spool or member B therein. The valve spool is adapted for manual actuation by linkage (not shown) attached to one end thereof.

In more particularity, the valve housing A has a generally circular cylindrical configuration with mounting flange means 11 extending outwardly from a side thereof. The flange means 11 has openings 12 provided therein and regularly spaced apart to receive fasteners (not shown) adapted to secure the control valve to any suitable fixture. Housing A has a stepped bore 13 provided therein and extends generally centrally throughout the cylindrical configuration thereof. The stepped bore 13 comprises a first portion 13a, being the larger portion of the stepped bore, and a portion 13b, being the smaller portion of the stepped bore. The smaller portion 13b has a pair of axially spaced annular grooves 14 and 15 provided therein and spaced apart by an annular surface 16. The larger portion 13a of the stepped bore is closed at one end by a cap 17 which is resiliently sprung into an annular recess 18 formed in the end portion of the valve body and concentrically disposed about the bore 13. At the opposite end of the valve housing, a recessed portion 20 is also provided at the end thereof concentric with the bore 13 and is adapted to receive and journal a seal 19 which seals between the housing A and the valve spool B during operation.

Conduit or inlet means 22 communicates the exterior of the valve body with groove 15 and conduit or outlet means 23 communicates the exterior of the valve body with the groove 14. The inlet means may be connected by any suitable apparatus to an oil pressure pump or other hydraulic fluid source having a predetermined level of pressure. The outlet means 23 may be connected by any suitable apparatus to a hydraulic device requiring fluid control, such as a clutch mechanism.

A port 26 is provided in the valve body and communicates the right-hand portion of the larger portion 13a of the stepped bore with the exterior of the housing and may be connected to a sump (not shown) for providing a return of scavenged oil. Cooperating with port 26 is conduit means 27 provided to communicate the space adjacent the seal 19 in the recess 20 with the larger portion 13a of the bore so as to return oil that may have found entrance thereinto back to sump via port 26. Similarly, conduit means 28 is adapted to communicate the chamber defined by the recessed portion 18 with the portion 13a of bore 13 and is adapted to return oil which has found entrance thereinto back to the sump by way of the port 26.

Turning now in more particularity to the valve member B, it comprises a central cylindrical body portion 30 having a plurality of axially spaced lands 31, 32, and 33 formed thereon. Lands 32 and 33 are of generally commensurate diametrical dimension and are adapted to slide in engaging relationship with the smaller portion 13b of the stepped bore 13. Land 31 is of a larger diametrical dimension than the other lands and is adapted to slide in engaging relationship with the larger portion 13a of the stepped bore 13. In the neutral condition of the valve device, wherein fluid is blocked between the inlet and outlet means, land 32 is aligned with the annular surface 16 of the valve housing and is spaced intermediate the annular grooves 14 and 15. A coiled compression return spring 35 is mounted about the left end 30a of the valve spool and is adapted to act between a snap ring 36 mounted within an annular groove formed in the left end of the valve spool and an annular ring 37 surrounding the valve spool and spaced inwardly of the left end thereof; the ring 37 has an outer diameter adapted to engage a snap ring 38 recessed and mounted within the wall defining the larger portion 13a of the stepped bore. When the valve member is moved to the right of neutral position as shown in FIGURES 1 and 3, the return spring 35 is stressed or compressed and tends to return the valve member back to the neutral position. When the valve member is moved to the left of neutral position, the annular ring 37 moves with the valve spool by virtue of its engagement with shoulder 39 formed on the valve spool and thus cannot compress the spring 35, resulting in no return effect.

Detent means 50 is provided to index the position of the valve spool in the neutral position and in the fully open position without the necessity of "hunting" by the operator. The detent means 50 comprises an extension 51 having ends 51a and 51b extending in opposite diametrical directions of the valve housing and having a central bore 52 provided therethrough extending also in a diametrical direction of the valve housing. Coiled compression springs 53 are disposed in the bore on each side of the valve spool and each spring has one end 53a adapted to bear against a threaded plug 54 received in the outermost portion of the extensions 51a and 51b and another end 53b which is adapted to bear against a ball 55. Each of the balls are thereby urged against the valve spool and may seat in detent grooves 56 or 57 provided in the outer surface of the valve spool; the grooves are aligned so as to receive the balls 55 in one or the other of the grooves when the valve spool is in the proper corresponding desired position. For example, the valve spool is in the neutral position when the balls are received and registered in groove 56.

The right-hand end 30b of the valve spool is provided with an aperture 40 adapted to receive manual operating means (not shown).

Lands 32 and 33 are axially spaced apart a distance so that the valve member may be moved to the left, straddling the inlet and outlet means 22 and 23 therebetween and providing for full fluid flow from the inlet means to the outlet means. The position of lands 32 and 33 in the last suggested position is shown in dotted outline in FIGURE 1.

Land 31 is axially spaced a distance from land 32 sufficient to enable the right-hand edge or lip 43 of land 31 to move across a triangularly shaped mouth 44 formed as the entrance to port 26, as the valve spool is moved throughout its stroke to the right of neutral position. During the stroke to the right, the left-hand edge or lip 45 is intended to move to the right of the edge or lip 46 of the annular groove 22. The triangular-shaped port has the narrower portion of the triangle positioned at the most left-hand position so that fluid drain may be increasingly cut off as the valve spool uniformly moves. The spacing of lands 31 and 32 is critical and must be determined so that a desired amount of fluid pressure acts against the side 31b of land 31 to give the proper amount of reaction or "feel" tending to return the valve member back to the neutral position shown in full line in FIGURE 1. This "feel" is due to differential forces acting against the differential areas of lands 31 and 32. In the initial stages of movement of the valve spool to the right of neutral position, a substantial volume of the oil that is admitted through the inlet means 22 will be diverted through the triangular-shaped port to the sump, since the greater portion of the area of the mouth 44 remains uncovered. As valve spool progresses to the right, larger portions of the triangular-shaped port will be covered and thereby forcing a greater flow to the outlet means 23 while at the same time increasing the pressure between lands 31 and 32, and acting thereagainst. The gradual build-up of pressure in accordance with movement due to the variance of the valve spool tending to urge the spool to the left affords a proportional "feel" to the operator. The response is quick and precise, enabling the operator to control the amount of fluid leaving the control valve. The amount of adjustment required by the operator to move the valve member back and forth is small due to the use of differential land areas which reduce the resultant return force to a practical magnitude.

Operation

If it is desired to place the control valve in a position so that full communication is had between the inlet and outlet means 22 and 23, the valve spool B is merely moved by the operator to the left from its neutral position as urged originally by spring 35 and until the valve member catches the detent ball in the detent groove. Should full flow not be desired, the operator may move the valve spool 30 manually to the right from the neutral position as far as desired and according to the amount of desired "feel" transmitted to operating means. The operator will sense greater resistance to valve movement to the right, the further it is moved, thereby indicating that a higher pressure is being delivered to the outlet means. Conversely, a lesser return force transmitted to the operating means indicates that a small amount of fluid is being permitted to flow to the outlet means. Such "feel" or proportional return force results from the differential pressures acting against the lands 31 and 32 and varies in magnitude according to the extent land 31 covers the triangular-shaped mouth 44 of port 26.

While a certain preferred embodiment of the invention has been specifically disclosed, it is understood that the invention is not limited thereto, as many variations will be readily apparent to those skilled in the art; and the invention is to be given its broadest possible interpretation within the terms of the following claims.

I claim:

1. A hydraulic control valve comprising: a valve housing having fluid inlet and outlet means and drain outlet means, said housing having chamber means communicating said inlet, outlet, and drain outlet means; a manually operated valve member disposed in said housing and adapted to control the flow of fluid between said inlet and outlet means and carrying means effective to gradually close off increasingly greater increments of said drain outlet means in accordance with each equal increment of movement of said valve member between a first position in which said fluid flow is permitted freely between said inlet and outlet means and a second position in which fluid flow is substantially restricted between said inlet and outlet means, said valve member having differential surfaces subject to fluid pressure in said chamber means and adapted to resist manual movement of said valve member toward said second position in accordance with the prevailing pressure in said chamber means thereby to impart a "feel" to the operator which is correlated with the degree of movement of said valve member.

2. A hydraulic control valve comprising: a valve housing having fluid inlet and outlet means and drain outlet means, said drain outlet means including a triangular shaped opening provided in said housing, said housing having chamber means communicating said inlet, outlet, and drain outlet means; a manually operated valve member disposed in said housing and adapted to control the flow of fluid between said inlet and outlet means and carrying closing means including a cylindrically shaped land effective to gradually close off increasingly greater increments of said drain outlet means in accordance with each equal increment of movement of said valve member between a first position in which said fluid flow is permitted freely between said inlet and outlet means and a second position in which fluid flow is substantially restricted between said inlet and outlet means, said closing means being effective to move across the triangular shaped opening in a manner whereby one corner of the triangle is initially closed while the land moves toward an opposite side of the triangle, said valve member having differential surfaces subject to fluid pressure in said chamber means and adapted to resist movement of said valve member toward said second position in accordance with the prevailing pressure in said chamber means thereby to impart a "feel" to the operator which is correlated with the degree of movement of said valve member.

3. A hydraulic control valve comprising: a housing having a bore therein, inlet means communicating with a suitable pressure source and outlet means, said housing further having means defining a drain outlet for returning fluid back to a suitable sump, and a valve spool slidable in said bore for regulating the flow of fluid between said inlet and outlet means, said valve spool having lands provided thereon in spaced relationship whereby upon movement of said spool in one direction from a neutral position fluid may pass freely between said inlet and outlet means and when moved in the other direction of said neutral position fluid may flow both through said outlet means and through said drain outlet according to the extent of movement in said latter direction from the neutral position, said valve spool carrying a reaction means subject to the pressure of said fluid flowing through said outlet means and said drain outlet when said spool is moved in said opposite direction, said reaction means being adapted to proportionately close off more of said drain outlet as said spool is moved further from said neutral position and thereby tending to return said valve spool back to said neutral position with proportionately greater force.

4. A hydraulic control valve comprising: a valve housing having fluid inlet and outlet means and fluid drain outlet means spaced to one side of said inlet and outlet means, said housing having a central stepped bore with the smaller stepped portion thereof communicating said inlet and outlet means and the larger stepped portion thereof of said stepped bore communicating with said drain outlet means, a spool valve slidable in said stepped bore and carrying a plurality of lands thereon adapted to control fluid flow between said inlet and outlet means and said drain outlet means, a pair of said lands being adapted to slide within the smaller stepped portion of said bore and spaced apart so that the valve spool may be moved to an axial position permitting full fluid flow between said pair of lands, a third land being spaced axially to one side of said pair of lands and being adapted to slide within the larger stepped portion of said bore, said third land having a greater surface subject to fluid flow between said inlet and outlet means than said pair of lands, said third land being spaced from said pair of lands so that when said valve spool is moved in one direction, fluid may flow to said outlet means between said third land and said pair of lands and so that said third land may gradually close off said drain outlet means with increasingly greater increments as said valve spool is moved with equal axial increments.

5. The control valve as in claim 4, in which said valve spool and housing have means providing for three regular conditions of the valve, a fully open condition wherein fluid may flow freely between said inlet and outlet means, a neutral position in which fluid is prevented from flowing from said inlet and outlet means, and a third condition in which fluid flow is gradually controlled in accordance with the degree of axial movement of said valve spool, said valve having resilient means normally urging said valve spool to said neutral condition, and detent means adapted to station said valve spool in the fully opened condition or in the neutral condition as moved by the operator.

References Cited by the Examiner
UNITED STATES PATENTS 2,526,361  10/50  Johnson _____ 251—205 XR
2,876,797  3/59   Edman _____ 137—625.69

M. CARY NELSON, *Primary Examiner.*

LAVERNE D. GEIGER, *Examiner.*